United States Patent Office 3,562,842
Patented Feb. 16, 1971

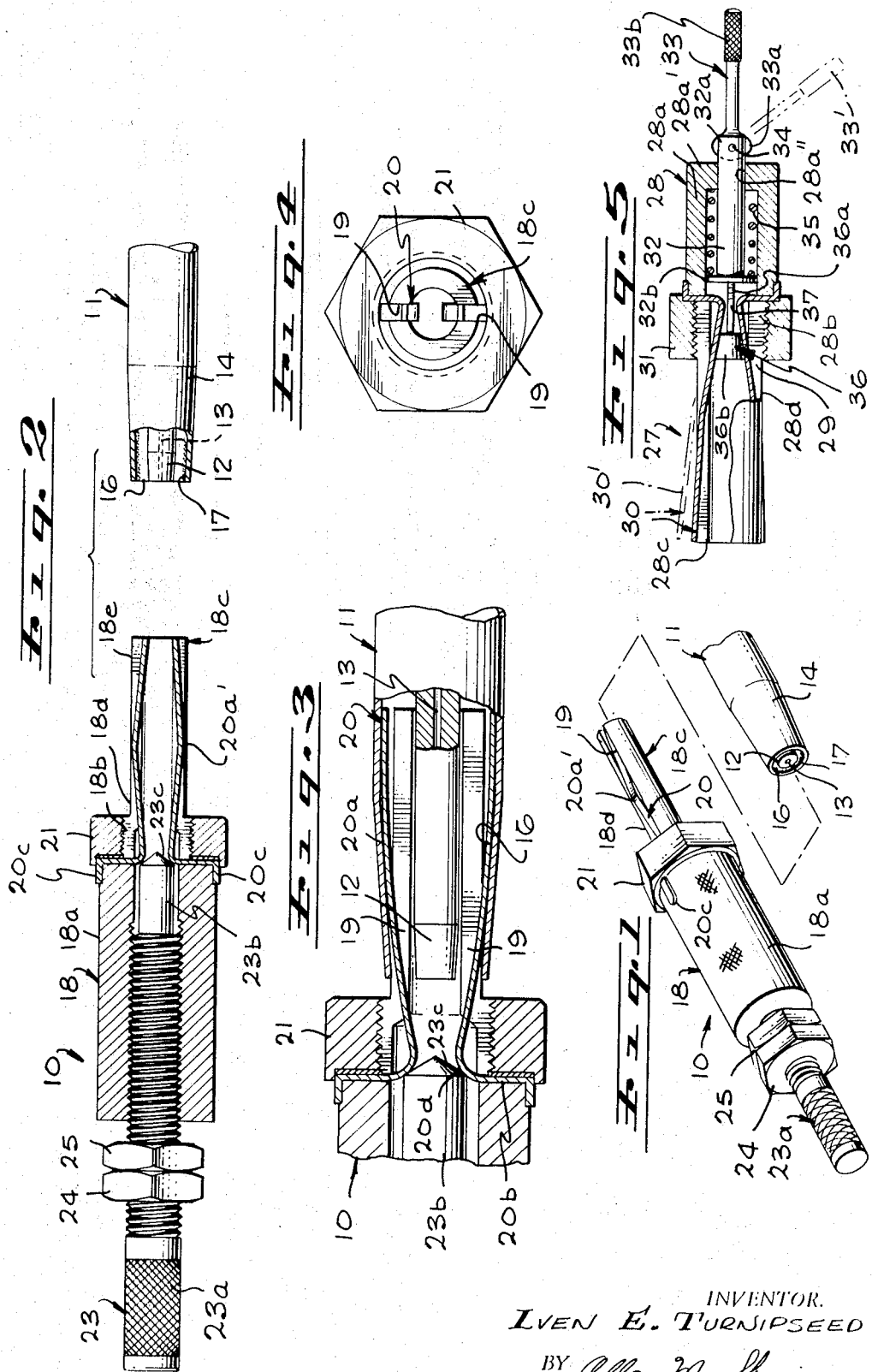

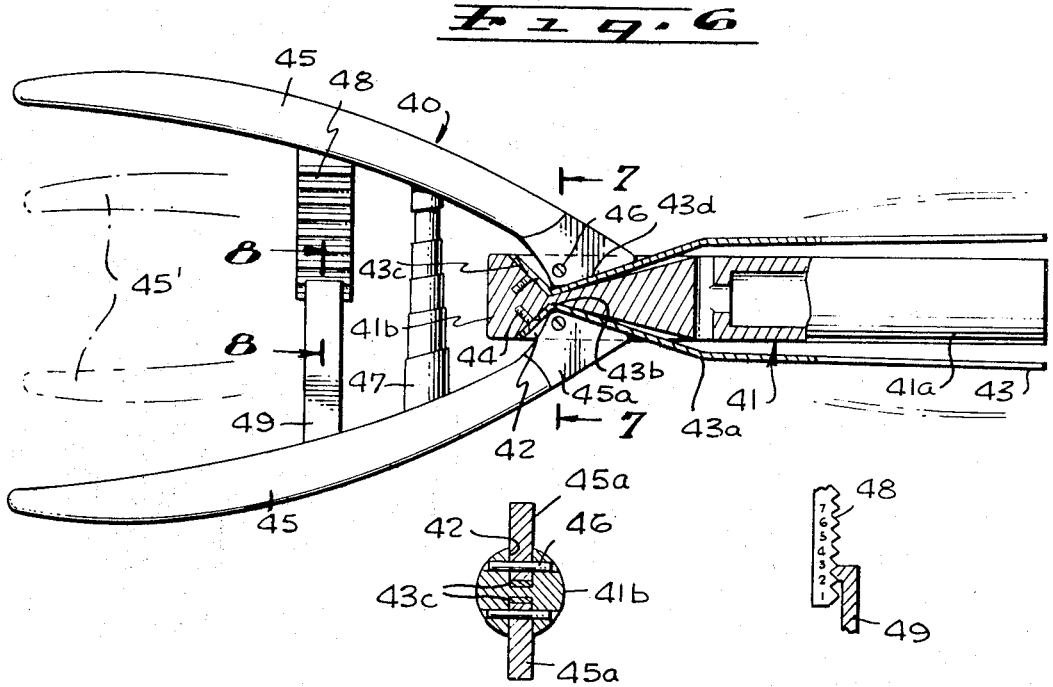
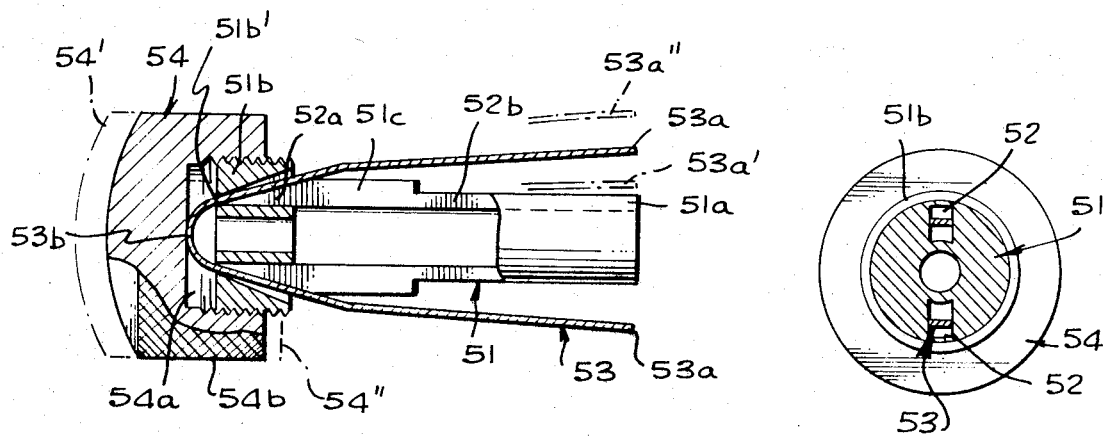

3,562,842
WELDING TIP CLEANING DEVICE
Iven E. Turnipseed, Los Angeles, Calif.
(10633 Mount Gleason Ave., Sunland, Calif. 91040)
Filed Jan. 29, 1969, Ser. No. 795,017
Int. Cl. B08b 1/04
U.S. Cl. 15—104.09                                    11 Claims

ABSTRACT OF THE DISCLOSURE

A device for cleaning a welding tip of the type used for gas metal arc welding. The device comprises a tubular shaft adapted for mating engagement about the welding tip guide tube. A pair of blade members are diagonally oppositely disposed along the exterior of the shaft, sufficiently close thereto to permit insertion through the gas nozzle opening of the welding tip to be cleaned. An actuator means spreads the blades away from the shaft and against the inner surface of the welding tip gas nozzle so that relative rotation of the cleaning device and the nozzle causes the blades to scrape undesired residue from the interior of the welding tip.

BACKGROUND OF THE INVENTION (1) Field of the invention

The present invention relates to a welding tip cleaning device and, more particularly, to a cleaning device insertable through the gas nozzle opening of a gas metal arc welding tip and including deflectable scraper blades for scraping residue from the interior of the gas nozzle.

In the automotive industry, as in various other fields, the most commonly used welding equipment is of the shielded inert gas metal arc variety. In such equipment, the welding tip comprises a metal guide tube having a very small inner diameter and a gas nozzle concentrically spaced from the guide tube. Filler wire is fed through the guide tube to the workpiece, a DC power supply being connected between the filler wire and the workpiece to produce an arc therebetween. An inert gas, such as helium, argon or carbon dioxide, is fed through the gas nozzle to the arc area, the inert gas providing a shield around the arc which prevents oxidation from occurring at the weld point.

As is well known, when the welding conditions are not properly adjusted, considerable spatter may occur around the workpiece. For example, such spatter typically occurs when the arc length is too short, a condition often accompanied by a sharp cracking or frying sound. Some of this metal spatter tends to accumulate within the inner surface of the welding tip gas nozzle, together with other residues of the welding process. These other residues possibly include the black iron oxide, $Fe_3O_4$, which may be formed when welding ferrous materials if insufficient inert gas is provided to insure complete isolation of the arc from oxygen in the air. As these residues build up on the inside of the gas nozzle, they inhibit the smooth flow of inert gas through the welding tip, thereby preventing effective welding. When such excess residue buildup occurs in the welding tip, the welding operation must be stopped, and the tip cleaned.

(2) Description of the prior art

In the past, cleaning of a gas metal arc welding tip has involved manual use of a knife or similar instrument to scrape the interior of the gas nozzle for removal of the above-described residue. Since it is difficult and time-consuming to accomplish effective scraping through the small annular opening at the end of the gas nozzle, it often is necessary to remove the entire welding tip from its holder so that the gas nozzle can be separated from the guide tube for independent cleaning. Of course, such operation is time-consuming; since excessive welding tip residue buildup often occurs after relatively short periods of use, the labor involved in cleaning the tip consititutes an expensive portion of the total welding cost. No device exists in the prior art for efficient cleaning of the welding tip without disassembling it.

This shortcoming of the prior art is overcome by the inventive cleaning device which is insertable in the welding tip through the gas nozzle opening thereof, the device matingly engaging the guide tube, and having scaper blades adapted to deflect outwardly to contact the inner surface of the gas nozzle for rapid effective scraping thereof. No disassembly of the welding tip is required.

SUMMARY OF THE INVENTION

In accordance with the present invention, there is provided a novel welding tip cleaning device useful for scraping residue from within the gas nozzle of a gas metal arc welding tip. The device incorporates a pair of diagonally opposed scraper blades which, in a rest position, are insertable into the welding tip through the annular gas nozzle opening. Actuator means are provided for spreading the scraper blades apart and into contact with the interior wall of the welding tip gas nozzle. When so extended, relative rotation of the cleaning device with respect to the welding tip results in scraping of the residue from the gas nozzle. In preferred embodiments, the device is provided with a tubular shaft having an inner diameter slightly greater than the outer diameter of the welding tip guide tube and adapted for slidably mating engagement therewith, while the scraper blades are disposed along the exterior of the shaft.

The actuator means for deflecting the scraper blades may take several forms. For example, in one embodiment the shaft extends from a unitary body, generally tubular in shape, and slotted at its shank portion. The scraper blades extend through the slots and along the outer wall of the shaft. An actuating bolt threadingly engages the interior of the body handle portion, the conical forward end of the actuating bolt pressing against the blade sections within the body so as to cause deflection of the blades as the bolt is screwed in.

In a second embodiment, a drawbar of truncated conical shape is disposed within the unitary body in contact with the interior blade sections. A spring biased drawbar sleeve, actuated by a cammed lever, causes the drawbar to push against the blades, spreading them into the scraping position.

In another embodiment, the actuator means incorporates an adjustment cap. In this device, the blades comprise portions of a U-shaped member, the bottom of which abuts against an adjustable threaded cap screwed onto the rear end of the cleaning device body. Appropriate control of the adjustment cap causes the necessary deflection of the scraper blades.

Also disclosed is another embodiment of pliers-like construction. In this welding tip cleaning device, the blades are attached to a pair of handles pivotally attached to the rear end of the guide tube engaging shaft. A spring biases the handles apart, causing the blades to remain against the shaft in their rest position. The blades are deflected by squeezing the handles together, a ratchet and pawl arrangement insuring that the blades are not spread excessively as well as providing retention of the handles in any repeatable selection position.

Thus, it is an object of the present invention to provide a cleaning device for a welding tip.

It is another object of the present invention to provide a device for cleaning a welding tip of the type commonly utilized in gas metal arc welders, no disassembly of the welding tip being required to utilize the inventive device.

Another object of the present invention is to provide a welding tip cleaning device insertable through the annular gas nozzle opening of the welding tip.

Yet another object of the present invention is to provide a welding tip cleaning device comprising a shaft adapted for mating engagement with the welding tip guide tube, and incorporating scraper blades which may be deflected into contact with the welding tip gas nozzle.

A further object of the present invention is to provide a welding tip cleaning device comprising a shaft adapted to slide over the welding tip guide tube, a pair of scraper blades which in their rest position lie along the exterior wall of the shaft, and actuator means for deflecting the blades into contact with the welding tip gas nozzle inner wall.

Yet a further object of the present invention is to provide a welding tip cleaning device comprising a body having a shaft extending from one end thereof, a pair of diagonally oppositely disposed scraper blades disposed along the exterior of the shaft, and actuating means comprising either a threaded actuating bolt or a drawbar disposed within the body and adapted to cause controlled deflection of the blades away from the shaft.

It is yet a further object of the present invention to provide a cleaning device for a welding tip incorporating a U-shaped member the sides of which form scraper blades normally disposed along the exterior of a tubular shaft, and incorporating an adjustment cap for applying pressure against the bottom of the U-shaped member to cause deflection of the blades.

Still a further object of the present invention is to provide a pliers-like welding tip cleaning device incorporating a cylindrical body, one end of which functions as a shaft adapted for mating engagement with the guide tube of a welding tip, and pivotally attached to the other end of which are a pair of handles having scraper blades extending therefrom.

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

BRIEF DESCRIPTION OF THE DRAWINGS

FIG. 1 is an exploded perspective view of a first embodiment of the inventive welding tip cleaning device and a welding tip of the type commonly utilized in gas metal arc welders.

FIG. 2 is an exploded side elevation view, partly broken away and in section, of the welding tip and inventive cleaning device shown in FIG. 1, with the scraper blades in their rest position adjacent the exterior wall of the cleaning device shaft.

FIG. 3 is an enlarged fragmentary sectional view, partly in elevation, of the cleaning device embodiment of FIGS. 1 and 2 shown inserted within a welding tip with the blades spread into contact with the welding tip gas nozzle inner wall.

FIG. 4 is an end view of the welding tip cleaning device shown in FIGS. 1 through 3.

FIG. 5 is a longitudinal sectional view, partly broken away and in elevation, showing an embodiment of the inventive welding tip cleaning device utilizing a cammed lever actuated drawbar for deflection of the scraper blades.

FIG. 6 is an elevation view of a pliers-like version of the inventive welding tip cleaning device, with phantom lines indicating an operative position.

FIG. 7 is a transverse sectional view taken generally along line 7—7 of FIG. 6.

FIG. 8 is a fragmentary sectional view showing the ratchet and pawl arrangement for maintaining the handles of the pliers-like welding tip cleaning device at a selected separation, as seen generally along line 8—8 of FIG. 6.

FIG. 9 is a longitudinal sectional view, partly broken away and in elevation, of an adjustment cap version of the inventive welding tip cleaning device.

FIG. 10 is a sectional end view of the cleaning device shown in FIG. 9.

DESCRIPTION OF THE PREFERRED EMBODIMENTS

Referring now to the drawings, a first embodiment of the inventive welding tip cleaning device is shown in FIGS. 1–4. In FIGS. 1, 2 and 4 thereof, the cleaning device 10 is shown separated from a welding tip 11 of the type commonly utilized in gas metal arc welders. In FIG. 3, cleaning device 10 is shown in mating engagement with the welding tip.

Conventional welding tip 11 comprises a guide tube 12 having an axial bore 13 extending through its entire length. When used for welding, filler wire (not shown) is fed to the workpiece through bore 13. Concentrically surrounding guide tube 12, and spaced therefrom is a metal gas nozzle 14, attached at its back end to a handle (not shown) of the welding apparatus. Generally, the open end 16 of gas nozzle 14 is substantially coplanar with the end of guide tube 12. As discussed hereinabove, during the welding operation, an inert gas such as argon or helium is fed to the workpiece through the space between gas nozzle 14 and guide tube 12. Spatter and other undesired by-products of the welding process tend to accumulate on the inner wall of gas nozzle 14, causing a buildup therein of a residue indicated generally at 17. The inventive cleaning apparatus 10 is designed to accomplish scraping removal of this residue 17 as well as any similar residue on the guide tube 12.

As shown in FIGS. 1–4, cleaning device 10 comprises a unitary, generally tubular body 18 having a knurled handle portion 18a, a threaded neck portion 18b of smaller diameter than handle portion 18a and a shaft portion 18c. Shaft portion 18c itself comprises two sections, a shank 18d adjacent to, and of smaller outside diameter than neck portion 18b, and an end section or shaft 18e having an outer diameter smaller than that of shank 18d. Preferably, the inside diameter of the axial bore of shaft portion 18c is just slightly larger than the outside diameter of guide tube 12 of welding tip 11. The outside diameter of shaft 18e is somewhat smaller than the inside diameter of the opening 16 of gas nozzle 14. The outside diameter of shank 18d is selected to just clear the inside diameter of welding tip opening 16. These diameter relationships permit mating engagement of shaft portion 18c about guide tube 12 within welding tip gas nozzle 14, as shown in FIG. 3.

As best seen in FIGS. 3 and 4, a pair of oppositely disposed, longitudinal slots 19 extend the entire length of neck portion 18b and shaft portion 18c. A pair of arcuate scraper blades 20, preferably of spring steel, extend respectively through slots 19, projecting along shaft portion 18c for a distance approximately equal to the length thereof. Each of blades 20 comprises an elongate scraper portion 20a which may be gently curved, as indicated in FIG. 3, or may contain an obtuse bend 20a' as shown in FIGS. 1 and 2. In either case, arcuate portion 20a terminates within the interior of body 18, being integrally provided with a radially outwardly extending blade section 20b which passes back through slot 19 and seats generally against the end of handle portion 18a. The rearward other end of blade section 20b is bent rearwardly to provide a flange tab 20c which seats in a notch 18f provided at the neck end of handle portion 18a.

Scraper blades 20 are maintained in place by means of a lock nut 21 having an annular recess 21a in the rearward face thereof and a washer 22 disposed within recess 21a for bearing against the radial blade sections 20c. Lock nut 21 threadingly engages neck portion 18b so as to retain sections 20b of blades 20 against the end of handle portion 18a.

As shown in FIGS. 1 and 2, blade portions 20a of scraper blades 20 normally lie within slots 19, the bend or curvature of blades 20a insuring that their maximum projection away from shaft 18c is sufficiently small so as to permit insertion through opening 16 of the welding tip 11 to be cleaned.

The interior of handle portion 18a of tubular body 18 is threaded to receive an exteriorly threaded actuating bolt 23. To facilitate manual adjustment of bolt 23, the end 23a of the bolt extending from the rear of body 18 is knurled. The other end 23b of actuating bolt 23, interior of body 18, is unthreaded, terminating in a conical tip 23c. A pair of lock nuts 24 and 25 are disposed about the threaded portion of actuating bolt 21 which projects behind body 18.

As apparent in FIGS. 2 and 3, the maximum diameter of conical tip 23c is greater than the spacing between blades 20 at their bent junctions 20d of sections 20a and 20b. Thus, by rotating actuating bolt 23 with respect to body 18, conical tip 23c may be made to push forwardly against scraper blades 20 at their bends 20d, thus resiliently axially deflecting sections 20b from their resting positions shown in FIG. 2 to their actuated positions shown in FIG. 3. Such deflection causes blade portions 20a to spread out away from shaft 18c, as to the position shown in FIG. 3. Adjustment nut 25 may be preset appropriately to limit the inward travel of actuating bolt 23 so as to prevent excessive spreading or breakage of blades 20 as well as to accommodate any particular gas nozzle 14, with lock nut 24 then tightened against adjustment nut 25 to maintain such setting.

The operation of inventive welding tip cleaner 10 now should be apparent. Initially, actuating bolt 23 is set to the position shown generally in FIG. 2, so that the forward blade ends 20a are disposed within slots 19 and with conical tip 23c just barely contacting blades 20. Shaft portion 18c then is matingly inserted about guide tube 12 of the welding tip 11 to be cleaned. As noted, in this configuration, scraper blades 20a will pass through opening 16 to the region within gas nozzle 14.

With the shaft so inserted, actuating bolt 23 is rotated with respect to body 18, causing conical tip 23c to press against blades 20. As a result, blade portions 20a are spread to the position shown in FIG. 3, the blades being in substantially continuous contact with an elongate portion of the interior of gas nozzle 14. Next, the entire cleaning device 10 is rotated via handle 18a with respect to welding tip 11, blades 20 scraping any residue 17 from the inner wall of gas nozzle 14 during this rotation. Appropriate presetting of nuts 24 and 25 insures that excess pressure is not exerted by blades 20 against gas nozzle 14 as might cause cutting or grounding thereof. Note that shank 18d, being just of clearance diameter with respect to opening 16, insures the continued coaxial relationship of cleaner 10 with respect to welding tip 11, thereby preventing accidental bending of guide tube 12. When the cleaning has been completed, actuating bolt 23 is threadedly rotated for partial withdrawal to its position of FIG. 2, permitting scrapper blade sections 20b to spring back to their rest position of FIG. 2 whereby scraping sections 20a similarly are withdrawn radially into slots 19, allowing cleaner 10 to be withdrawn from welding tip 11.

A second embodiment of the inventive welding tip cleaning device is shown in FIG. 5. In this embodiment, a cam actuated drawbar is used to control scraper blade deflection.

As evident in FIG. 5, welding tip cleaning device 27 comprises a unitary, generally tubular body 28 having a handle portion 28a, a threaded neck portion 28b, a shaft 28c and a shank 28d, corresponding, respectively, to elements 18a, 18b, 18c and 18d, respectively, of the cleaning device 10 shown in FIGS. 1-4. In the embodiment of FIG. 5, however, the interior of handle portion 28a is not threaded, and the back end 28a' of handle portion 28a is closed except for a coaxial opening 28a'' therethrough. A pair of diagonally oppositely disposed, elongate slots 29 extend through the walls of neck portion 28b and shank 28d; slots 29 correspond to those designated 19 in the embodiment of FIGS. 1-4.

Still referring to FIG. 5, a generally arcuate pair of scraper blades 30 extend through slots 29 and along shaft 28c. Scraper blades 30, which correspond in shape and function to scraper blades 20 of the embodiment of FIGS. 1-4, are attached to body 28 by means of a recessed lock nut 31 corresponding to lock nut 21 of the above described embodiment.

Coaxially disposed within the interior of handle portion 28a is a rod-shaped drawbar sleeve 32, one end 32a of which extends through opening 28a'' so as to project beyond the end 28a' of body 28. Pivotally connected to this outwardly projecting end 32a is a cam lock handle 33 having a cam at end 33a thereof, and a knurled handle 33b at the other end thereof. A pivot pin 34 provides this pivotal connection.

The other end 32b of drawbar sleeve 32 is an annular flange just clearing the inner wall of handle portion 28a. A coil spring 35 surrounds sleeve 32 between flanged end 32b and the closed end 28a' of body 28. Thus, sleeve 32 is reciprocable coaxially within body 28, being biased in the forward direction by spring 35.

Extending forwardly from the flanged end 32b of sleeve 32 is a drawbar 36 comprising a threaded shaft 36a connected to a truncated conical member 36b. Shaft portion 36a passes through the region 37 of separation between blades 30 and is threadedly engaged to drawbar sleeve 32. Thus, the distance between flange end 32b and conical member 36b may be adjusted by threading shaft 36a into sleeve 32 a greater or lesser amount. Preferably, this distance is adjusted so that conical member 36b just touches blades 30, forwardly of region 37, in the rest position wherein the forward ends of blades 30 are disposed along shaft 28c and sleeve 32 is biased to its most forward position.

Operation of the welding tip cleaner embodiment of FIG. 5 now will be apparent. In the rest position, with the minimum diameter portion of cammed end 33a of handle 33 abutting against the rear 28a' of body 28, shaft 28c and blades 30 can be inserted matingly within the welding tip gas nozzle to be cleaned. To deflect blades 30 away from shaft 28c, cam lock handle 33 is rotated about pivot pin 34, as to the position shown in phantom at 33'. The camming action of handle end 33a then will draw sleeve 32 toward the rear of body 28, carrying drawbar 36 in the same direction. This in turn causes truncated conical member 36b to press against blades 30 in the manner of a wedge, forcing the blades to deflect outwardly to a position such as shown in phantom at 30'. In this cleaning position, blades 30 will be in contact with the interior surface of the gas nozzle of the welding tip being cleaned by the relative rotation of the device and the welding tip. When cam lock handle 33 once again is returned to the rest position, bias spring 33 returns drawbar 36 to its rest position, with blades 30 also returning to their rest position adjacent the exterior wall of shaft 28c.

A pliers-like embodiment of the inventive welding tip cleaner is shown in FIGS. 6, 7 and 8. In this embodiment, welding tip cleaning device 40 includes a unitary body 41, the front portion of which comprises a tubular, openended shaft 41a. Shaft 41a is analogous to shaft 18e in the embodiment of FIGS. 1-4, and in like manner has an inner diameter just slightly larger than the outer diameter of the feed tube of the welding tip to be cleaned. The rear portion 41b of body 41 is generally circular in crosssection (see FIG. 7) and includes a pair of diagonally oppositely disposed, generally V-shaped elongate slots 42 therein.

A pair of arcuate scraper blades 43 extend from within slot 42 along the exterior of shaft 41a. Like blades 20 of the cleaning device of FIGS. 1–4, the shape of arcuate blades 43 is not critical. Thus, the blades may be gently curved, or may include an obtuse bend such as that shown at 43a. Within slot 42 each blade 43 is bent at 43b, the rear blade portion 43c optionally being attached to rear body portion 41b by means of a flathead screw 44.

A pair of handles 45 extend rearwardly from slots 42, the generally flat forward ends 45a of handles 45 being pivotally attached to body 41 by appropriate pins 46 and bearing against a portion 43d of each blade 43 just forward of bend 43b. Preferably, the spring steel blades 43 are pre-stressed to resiliently tend to deflect away from shaft 41a by pivoting outwardly about blade bend 43b when handle ends 45a are pivoted outwardly by the manual squeezing together of handles 45; alternatively, blade portions 43d may be attached to blade ends 45a as by welding.

A spiral type spring 47 is provided between handles 45 to bias them apart. Thus, bias spring 47 normally maintains blades 43 in a rest position adjacent shaft 41a. Also disposed between handles 45 is a ratchet and pawl arrangement comprising a straight ratchet 48 depending from one of handles 45, and a pawl 49 extending from the other of handles 45. As shown in FIG. 8, appropriate numerical indicia may be provided adjacent the teeth of ratchet 48 to indicate the corresponding expansion of blades 43.

The operation of welding tip cleaning device 40 shown in FIGS. 6–8 now should be understood readily. Initially, ratchet 48 and pawl 49 are disengaged and bias spring 47 maintains handles 45 spread out to keep blades 43 in their rest position adjacent shaft 41a. In this position, blades 43 can be inserted readily through the gas nozzle opening of the welding tip being cleaned, shaft 41a simultaneously matingly engaging the welding tip guide tube. Once so inserted, handles 45 are squeezed together, as to the position shown in phantom at 45' in FIG. 6, whereby scraper blades 43 deflect outwardly to a position as shown in phantom at 43' in FIG. 6. As the handles are squeezed together, pawl 49 engages successive teeth in ratchet 48. By noting the indicia on ratchet 48, handles 45 may be brought together repeatably only to the degree necessary to spread blades 43 into contact with the inner surface of the particular welding tip gas nozzle to be cleaned.

Cleaning device 40 then is rotated with respect to the welding tip, blades 43 scraping all undesired residue from the interior of the gas nozzle. When cleaning has been completed, pawl 49 is released from ratchet 48, and spring 47 biases handles 45 to their normally open position, returning blades 43 to their rest position adjacent shaft 41a. Cleaning device 40 then may be removed from the welding tip. Alternatively, cleaning device 40 may be withdrawn from the welding tip simultaneously with the rotary cleaning action with the blades 43 resiliently deflecting inwardly toward the shaft 41a during such withdrawal.

Still another embodiment of the inventive welding tip cleaning device is shown in FIGS. 9 and 10. In this embodiment, welding tip cleaning device 50 utilizes an adjusting cap to control separation of the scraper blades.

Referring to FIGS. 9 and 10, welding tip cleaning device 50 includes generally tubular, unitary body 51 comprising a tubular shaft 51a at one end, an exteriorly threaded region 51b at the other end, and an intermediate shank 51c. Generally, sections 51a, 51b, 51c of body 51 correspond respectively to sections 18e, 18b and 18d of body 18 in the embodiment of FIGS. 1–4. A pair of diagonally oppositely disposed openings 52a extend through threaded region 51b at an obtuse angle with respect to the axis of body 51 and are continuous with a pair of slots 52b extending along the body or shaft sections 51c and 51a.

In the embodiment of FIGS. 9 and 10, the sides of an integral substantially U-shaped spring member 53 project through openings 52a to form blades 53a. As in the other embodiments of the invention described hereinabove, scraper blades 53a are generally arcuate, and may include an obtuse bend. The closed bottom 53b of U-shaped member 53 extends between openings 52 at the rear of body 51, and is covered by an adjusting cap 54, a threaded recess 54a of which threadingly engages body portion 51b. For convenience, the exterior surface 54b of adjusting cap 54 may be knurled.

Blade member 53 is sufficiently resilient so that, when adjusting cap 54 is unscrewed to the position shown in phantom at 54' in FIG. 9, blades 53a will spring toward each other and rest along shaft 51a at least partially within slots 52b, as at the position shown in phantom at 53a' in FIG. 9. In this position, the blades can be inserted within the gas nozzle of the welding tip to be cleaned, as shaft 51a matingly engages the guide tube of the welding tip. To spread blade members 53a away from shaft 51a and into the position appropriate for cleaning the interior of the gas nozzle, adjusting cap 54 is screwed toward the front of body 51, as to the position indicated in phantom at 54" in FIG. 9. The resultant pressure on the bottom 53b of U-shaped member 53 causes the latter to be forced against the shank edges 51b' of slots 52a whereby blades 53a expand away from shaft 51a, as to the position indicated in phantom in FIG. 9 at 53a". Note that the slots or openings 52a are of sufficient size to accommodate the necessary deflection of blades 53a from the rest to the scraping position.

What is claimed is:

1. A device for cleaning a welding tip of the type having a guide tube concentrically surrounded by a gas nozzle, said device comprising:

a tubular shaft adapted for mating engagement about said guide tube, the outer diameter of said shaft being smaller than the opening diameter of said gas nozzle, said shaft being longitudinally slotted along its shank;

at least one elongate arcuate blade normally extending through said slot and along said shaft toward the end thereof, said blade being insertable within said nozzle as said shaft engages said guide tube; and actuator means for deflecting said blade away from said shaft and against the interior surface of said nozzle so that, when said device is rotated with respect to said welding tip, said blade will scrape the interior surface of said nozzle.

2. A welding tip cleaning device as defined in claim 1 wherein:

said tubular shaft forms one end of a unitary, generally tubular body, the other end of said body being exteriorly threaded and having an outer diameter greater than that of said shaft;

said shank being located between and having an outer diameter intermediate that of said shaft and said threaded end;

said slots comprising a pair of openings extending through said threaded end at an obtuse angle to the axis of said body;

a generally U-shaped member having sides extending through said openings to form said blades; and including an adjusting cap engaging said threaded end, whereby the pressure of said cap against the bottom of said U-shaped member causes deflection of said blades away from said shaft.

3. A welding tip cleaning device as defined in claim 1, said device comprising:

a pair of blades disposed on diagonally opposite sides of said shaft, each blade extending through a respective longitudinal slot through said shank.

4. A welding tip cleaning device as defined in claim 3 wherein:

said tubular shaft forms the forward portion of a unitary body of generally round cross-section;

said slots are V-shaped and are disposed in the rear portion of said body; and said actuator means comprises a pair of pliers-like handles pivotally attached respectively within said slots, the portions of said blades within said slots being attached to ends of said handles.

5. A welding tip cleaning device as defined in claim 4 further comprising:

a bias spring disposed between said handles.

6. A welding tip cleaning device as defined in claim 5 further comprising:

a straight ratchet depending from one of said handles and a pawl depending from the other of said handles and adapted for engagement with said ratchet.

7. A welding tip cleaning device as defined in claim 3 further comprising:

a unitary, generally tubular body having, in order, a handle portion, an exteriorly threaded neck portion having an auter diameter smaller than that of said handle portion, and said tubular shaft;

the shank of said shaft being adjacent to and having an outer diameter less than that of said neck portion;

the end portion of said tubular shaft having an outer diameter less than that of said shank; and said longitudinal slots extending through said neck portion and said shank for the entire length thereof.

8. A welding tip cleaning device as defined in claim 7 wherein:

each of said blades comprises an elongate, arcuate section extending exteriorly along the end portion of said shaft and through said slot to the interior of said body, terminating in a generally radially outwardly extending section projecting back through said slot; and including a lock nut threadedly engaging said neck portion in fastening relationship to said radially outwardly extending section against said handle portion.

9. A welding tip cleaning device as defined in claim 8 wherein said actuator means comprises:

a truncated conical drawbar disposed within said body;

a spring biased drawbar sleeve attached to said drawbar and coaxially disposed within said handle portion, part of said sleeve projecting beyond the rear of said body; and a cammed lever exterior of said body and pivotally attached to said projecting drawbar sleeve part whereby displacement of said cammed lever causes said sleeve to press said drawbar against said blade portions, said pressure causing deflection of said blades away from said shaft.

10. A welding tip cleaning device as defined in claim 8 wherein:

said actuator means comprises a bolt which threadingly engages the interior of said handle portion, one end of said bolt being adapted to press against the portions of said blades within said body, said pressure causing deflection of said blades away from said shaft.

11. A welding tip cleaning device as defined in claim 10 wherein:

the other end of said bolt projects beyond the rear of said body; and further comprising an adjustment nut and a lock nut threadingly engaging said bolt exteriorly of said body.

References Cited

UNITED STATES PATENTS

| | | | |
|---|---|---|---|
| 1,431,200 | 10/1922 | Walters | 15—104.01 |
| 2,402,223 | 6/1946 | Wright | 15—242X |
| 3,284,608 | 11/1966 | McDonald | 15—104.16X |

WALTER A. SCHEEL, Primary Examiner

L. G. MACHLIN, Assistant Examiner

U.S. Cl. X.R.

219—130